Figure 1:
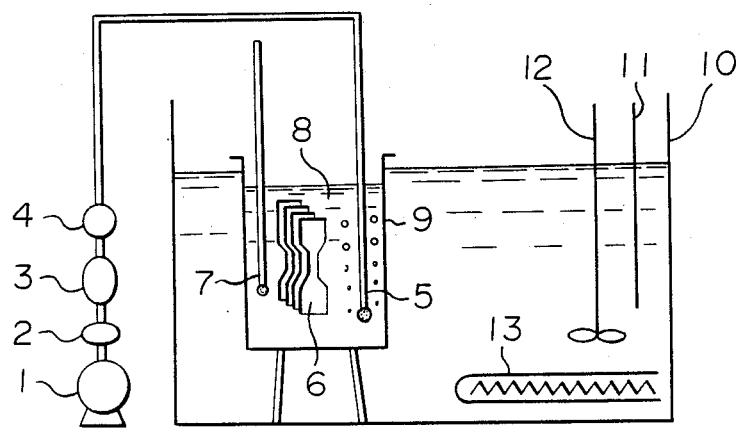

United States Patent [19] [11] Patent Number: 4,904,736
Shimizu et al. [45] Date of Patent: Feb. 27, 1990

[54] ACRYLIC RUBBER COMPOSITION

[75] Inventors: Hiroaki Shimizu, Oumi; Yasushi Abe, Machida; Masayoshi Ichikawa, Ichinomiya; Tomoaki Okita, Kasugai, all of Japan

[73] Assignees: Denki Kagaku Kogyo Kabushiki Kaisha, Tokyo; Toyoda Gosei Company Limited, Aichi, both of Japan

[21] Appl. No.: 206,133

[22] Filed: Jun. 13, 1988

[30] Foreign Application Priority Data

Jun. 16, 1987 [JP] Japan ............... 62-148027
Jun. 16, 1987 [JP] Japan ............... 62-148028

[51] Int. Cl.$^4$ ............................. C08F 8/30
[52] U.S. Cl. ........................... 525/279; 525/281;
525/304; 525/305; 525/327.3; 525/328.9;
525/329.6; 525/330.3; 525/330.5; 525/375;
525/379; 525/380; 525/382; 525/387
[58] Field of Search ............... 525/279, 281, 304, 305,
525/375, 379, 380, 382, 387

[56] References Cited

U.S. PATENT DOCUMENTS

| | | | |
|---|---|---|---|
| 3,873,494 | 3/1975 | Lewis. | |
| 3,883,472 | 5/1975 | Greene et al. | 525/329.6 |
| 3,904,588 | 9/1975 | Greene. | |
| 4,303,560 | 1/1981 | Takahashi et al. | 525/345 |
| 4,508,885 | 4/1985 | Nishiwaki et al. | |
| 4,517,348 | 5/1985 | Takahashi et al. | |

FOREIGN PATENT DOCUMENTS 34-14498 4/1959 Japan.

Primary Examiner—Joseph L. Schofer
Assistant Examiner—Bernard Lipman
Attorney, Agent, or Firm—Oblon, Spivak, McClelland, Maier & Neustadt

[57] ABSTRACT

An acrylic rubber composition comprising (A) a copolymer and (B) a crosslinking agent, said copolymer (A) consisting essentially of (a) from 3 to 10% by weight of ethylene, (b) from 0 to 10% by weight of at least one crosslinkable monomer selected from the group consisting of monomers of the formulas (1), (2), (3) and (4):

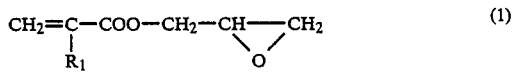

wherein $R_1$ is hydrogen or methyl,

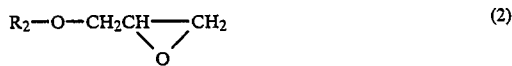

wherein $R_2$ is vinyl, allyl or methallyl,

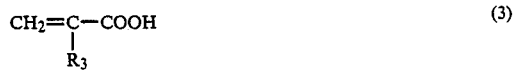

wherein $R_3$ is hydrogen or methyl,

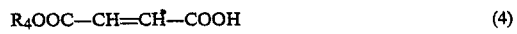

wherein $R_4$ is methyl, ethyl, propyl, butyl, methoxymethyl, methoxyethyl, methoxypropyl, methoxybutyl, ethoxybutyl, ethoxyethyl, ethoxypropyl or ethoxybutyl, and (c) from 80 to 97% by weight of other copolymer component, said other copolymer component (c) consisting essentially of (i) from 0 to 10% by weight of vinyl acetate, (ii) from 20 to 45% by weight of ethyl acrylate and (iii) from 45 to 70% by weight of n-butyl acrylate, the total amount of constituents (i), (ii) and (iii) being 100% by weight.

25 Claims, 1 Drawing Sheet

ACRYLIC RUBBER COMPOSITION

The present invention relates to an acrylic rubber composition having excellent heat resistance, cold resistance and oil resistance and having also excellent durability against deteriorated oil.

In recent years, acrylic rubber having excellent heat resistance and oil resistance has been used for lubricating oil resistant hoses of automobiles in place of conventional nitrile-butadine rubber, since thermal conditions in the automobile engine room have tended to be increasingly severe due to the requirement against exhaust gas, the trend for front wheel driving system and the advent of high power engines such as turbo-charger-equipped engines.

The severe thermal conditions for the engines and engine rooms have brought about a further problem such that the engine oil used for such engines tends to deteriorate, and the deteriorated engine oil (hereinafter referred to as deteriorated oil) in turn attacks the rubber hoses to deteriorate the rubber material. Accordingly, the hose material for lubricating oil to be used in the engine room is now required to have deteriorated oil resistance in addition to the conventional requirements such as oil resistance, cold resistance and heat resistance.

In view of such requirements, acryl rubber which has been accepted as a material having heat resistance and oil resistance is now desired to be improved in respect of the deteriorated oil resistance.

Japanese Examined Patent Publication No. 14498/1984 discloses that a rubber composition comprising a curing agent and a copolymer composed of ethylene (A)-vinyl acetate (B)-acrylate (C) with the component (C) being from 6 to 90% by weight and the weight ratio of (A)/(B) being at least 1, is excellent in the oil resistance, heat resistance and weather resistance. With the composition of this copolymer, the oil resistance is certainly at an acceptable level. However, in this publication, no consideration is given as to the oil resistance under severe conditions where engine oil deteriorates as mentioned above. Further, in this publication, no detailed study has been made with respect to the cold resistance of the composition.

It is an object of the present invention to provide an acrylic rubber composition having deteriorated oil resistance under severe thermal conditions (durability of the physical properties when dipped in deteriorated oil for a long period of time) as well as cold resistance, heat resistance and oil resistance in a well balanced condition.

The present invention provides an acrylic rubber composition comprising (A) a copolymer and (B) a crosslinking agent, the copolymer (A) consisting essentially of (a) from 3 to 10% by weight of ethylene, (b) from 0 to 10% by weight of at least one crosslinkable monomer selected from the group consisting of monomers of the formulas (1), (2), (3) and (4):

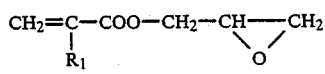 (1)

wherein $R_1$ is hydrogen or methyl,

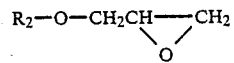 (2)

wherein $R_2$ is vinyl, allyl or methallyl,

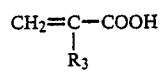 (3)

wherein $R_3$ is hydrogen or methyl,

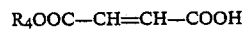 (4)

wherein $R_4$ is methyl, ethyl, propyl, butyl, methoxymethyl, methoxyethyl, methoxypropyl, methoxybutyl, ethoxybutyl, ethoxyethyl, ethoxypropyl or ethoxybutyl, and (c) from 80 to 97% by weight of other copolymer component, the other copolymer component (c) consisting essentially of (i) from 0 to 10% by weight of vinyl acetate, (ii) from 20 to 45% by weight of ethyl acrylate and (iii) from 45 to 70% by weight of n-butyl acrylate, the total amount of constituents (i), (ii) and (iii) being 100% by weight.

Now, the present invention will be described in detail with reference to the preferred embodiments.

Firstly, the components constituting the copolymer used in the present invention and their contents (proportions by % by weight) will be described.

The proportion of ethylene in the copolymer is at least 3% by weight and at most 10% by weight. If ethylene is less than 3% by weight, the cold resistance of the copolymer tends to be low, and if ethylene exceeds 10% by weight, the oil resistance tends to be inadequate.

Specific examples of the crosslinkable monomer of the formula (1) include glycidyl methacrylate and glycidyl acrylate. Likewise, specific examples of the crosslinkable monomer of the formula (2) includes vinyl glycidyl ether, allylglycidyl ether and methallylglycidyl ether.

Examples of the crosslinkable monomer of the formula (3) include acrylic acid and methacrylic acid. Likewise, specific examples of the crosslinkable monomer of the formula (4) include monomethyl maleate, monoethyl maleate, monopropyl maleate, monobutyl maleate, monomethoxymethyl maleate, monomethoxyethyl maleate, monomethoxypropyl maleate, monomethoxybutyl maleate, monoethoxymethyl maleate, monoethoxyethyl maleate, monoethoxypropyl maleate and monoethoxybutyl maleate.

The proportion of the crosslinkable monomer (b) in the copolymer (A) is at least 0.1% by weight and at most 10% by weight. When an amine type curing agent is used, if the proportion of the crosslinkable monomer (b) is less than 0.1% by weight, the crosslinking tends to be inadequate to obtain a practically useful crosslinked product, and if it exceeds 10% by weight, crosslinking tends to be excessive, whereby the mechanical properties of the crosslinked product tend to be poor, or the storage stability of the blended product tends to be low. The proportion of the crosslinkable monomer (b) is preferably within a range of from 1 to 7% by weight.

Other copolymer component (c) contains vinyl acetate in an amount of from 0 to 10% by weight based on the total amount of the component (c) being 100% by weight. If the vinyl acetate exceeds 10% by weight, the cold resistance tends to be low. Vinyl acetate may be incorporated in the form of a polymer blend, but may preferably be copolymerized so that the oil resistance of the copolymer rubber can further be improved. The content of n-butyl acrylate is from 45 to 70% by weight. If the content exceeds 70% by weight, the resulting copolymer rubber tends to swell in oil, and the oil resistance tends to be low.

The content of ethyl acrylate in the component (c) is from 20 to 45% by weight. If the content exceeds 45% by weight, the deteriorated oil resistance of the rubber tends to be low.

The crosslinkable monomers of the formulas (1) and (2) may be used in combination. Likewise, the crosslinkable monomers of the formulas (3) and (4) may be used in combination. Further, it is also possible to use a combination of the group of the formulas (1) and (2) and the group of the formulas (3) and (4). Usual methods commonly employed to obtain addition polymers may all be useful for the polymerization to obtain the copolymer to be used for the composition of the present invention. Emulsion polymerization, suspension polymerization and solution polymerization may preferably be employed.

As the crosslinking agent for crosslinking (curing) the copolymer containing the crosslinkable monomer (b), an amine type crosslinking agent may be employed. The amine type crosslinking agent includes, for example, methylenedianiline, guanidines and quaternary ammonium salts. These crosslinking agents are generally useful for the copolymer. However, by adopting the following selections depending upon the type of the crosslinkable monomer (b) used for the preparation of the copolymer, it is possible to obtain particularly good crosslinked products.

When the crosslinkable monomer (b) selected from the group consisting of monomers of the formula (1) and (2) is used for the copolymer, it is preferred to use a compound having an ability to open an epoxy group as the crosslinking agent. It is used preferably in an amount of from 0.1 to 5 parts by weight relative to 100 parts by weight of the copolymer. Such a crosslinking agent includes, for example, an imidazole compound such as 1-cyanoethyl-2-methylimidazole or 2-methylimidazole, an ammonium salt such as ammonium benzoate, cetyltrimethylammonium bromide, cetyltriethylammonium bromide or octadecyltrimethylammonium bromide, a dibasic acid and its acid anhydrides such as phthalic acid, maleic acid, hexahydrogenated phthalic acid and their anhydrides, an amine compound such as tetraethylenepentamine, hexamethylenediamine carbamate, N,N'-dicinnamylidene-1,6-hexanediamine, diphenylguanidine or di-o-tolylguanidine, and a dithiocarbamic acid salt such as a sodium salt or iron salt of dimethyldithiocarbamic acid. These compounds may be used in combination.

It is particularly preferred to employ a combination of an imidazole compound and at least one member selected from the group consisting of ammonium benzoate, guanidines, dibasic acids, dibasic acid anhydrides and alkyl sulfates. The alkylsulfates include sodium lauryl sulfate and sodium stearyl sulfate. Further, sulfur or a sulfur compound such as dipentamethylenethiuram nitrosulfide may be used in combination. Such sulfur or a sulfur compound may be used preferably in an amount of from 0.05 to 2 parts by weight relative to 100 parts by weight of the copolymer.

When the crosslinkable monomer (b) selected from the group consisting of monomers of the formulas (3) and (4) is used for the copolymer, a combination of at least one member selected from the group consisting of methylenedianiline and hexamethylenediamine carbamate and at least one member selected from the group consisting of diphenylguanidine and di-o-tolylguanidine, is usually used. They are used preferably in an amount of from 0.1 to 10 parts by weight, respectively, relative to 100 parts by weight of the copolymer.

When the crosslinkable monomer (b) is a combination of at least one member selected from the group consisting of crosslinkable monomers of the formulas (1) and (2) and at least one member selected from the group consisting of crosslinkable monomers of the formulas (3) and (4), both types of crosslinking agents may be used for such a copolymer. However, crosslinking agents as disclosed in Japanese Unexamined Patent Publication No. 26621/1986 are particularly effective. They include, for example, quaternary ammonium salts such as cetyltrimethylammonium bromide, ureas such as urea and dibasic acids such as azelaic acid. It is common to employ a combination of a quaternary ammonium salt with a urea or a dibasic acid. The total amount of the combination is preferably from 0.1 to 10 parts by weight relative to 100 parts by weight of the copolymer.

When the copolymer contains no crosslinkable monomer, the crosslinking agent which may be used for the rubber composition of the present invention, is preferably an organic peroxide. Such a peroxide includes, for example, benzoyl peroxide, 2,4-dichlorobenzoyl peroxide, 1,1-di(t-butylperoxy)-3,3,5-trimethylcyclohexane, n-butyl-4,4'-bis(t-butylperoxy)valerate, dicumyl peroxide, di-t-butyl peroxy-diisopropylbenzene, 2,5-dimethyl-2,5-di(t-butylperoxy)hexane and 2,5-dimethyl-2,5-di(t-butylperoxy)hexyne-3. Such a peroxide is used preferably in an amount of from 1 to 10 parts by weight relative to 100 parts by weight of the copolymer. If the amount is less than 1 part by weight, the crosslinking effect tends to be inadequate, and if the amount exceeds 10 parts by weight, the mechanical properties of the crosslinked product tend to be poor. More preferably, the amount is from 2 to 4 parts by weight.

To the composition wherein an organic peroxide is used, a curing coagent and/or a cure controlling agent may be added to obtain further improved properties.

Such a curing coagent may preferably be trimethylolpropane trimethacrylate, triallylcyanurate, triallylisocyanurate, triallyltrimellitate, ethylene glycol dimethacrylate, polyethylene glycol dimethacrylate, trimethylolpropane triacrylate, ethylene glycol diacrylate or polyethylene glycol diacrylate. It is used preferably in an amount of from 0.2 to 20 parts by weight, more preferably from 1 to 6 parts by weight, relative to 100 parts by weight of the copolymer.

The cure controlling agent is preferably trimethylthiourea or phenothiazine. It is used preferably in an amount of not higher than 5 parts by weight, more preferably from 0.1 to 1 part by weight relative to 100 parts by weight of the copolymer.

To the rubber composition of the present invention, other additives such as a reinforcing agent, a filler, a plasticizer, a processing aid and an aging preventive agent, which are commonly employed in rubber industry, may be incorporated, as the case requires, in order to control the processability, the mechanical properties and other properties.

In order to blend the crosslinking agent and the above-mentioned optional additives to the copolymer, a usual rubber kneader, such as an open roll mill or a bambury mixer, is used.

The copolymer composition of the present invention containing such a crosslinking agent and various additives, may be formed into a cured rubber product by a conventional process such as injection molding, press molding, extrusion molding and curing commonly employed in the rubber industry, and the rubber product is useful as automobile parts such as packings, gaskets, oil seals, hoses or belt diaphragms having excellent durability and as other industrially important functional parts.

Curing is usually conducted at a temperature of from 130° to 230° C. for from 1 minutes to 60 minutes. A temperature of from 150° to 200° C. is preferred.

The composition of the present invention is a material useful for providing industrial parts which are excellent in the cold resistance, oil resistance, heat resistance and deteriorated oil resistance and also have excellent durability.

Now, the usefulness of the invention will be described in further detail with reference to Examples. However, it should be understood that the present invention is by no means restricted by these specific Examples.

The compositions of copolymers in the following Examples were determined by the following compositional analysis.

For the analysis of an ethylene/vinylacetate/acrylate copolymer, the copolymer was rolled into a film and then dissolved in toluene, whereupon its NMR spectrum was taken, and the weight percentages of the respective components were determined from the resonance absorption peaks specific to the respective components.

For the determination of a crosslinkable monomer, the copolymer was dissolved in toluene, and a reagent reactive with the crosslinkable monomer was introduced and reacted, whereupon the consumed amount of the reagent was determined by titration, and the weight percentage in the copolymer was obtained.

The physical property tests were conducted as follows.

The Mooney viscosity of raw rubber was measured in accordance with JIS K 6300, and the hardness, tensile strength, elongation, heat resistance, oil resistance and permanent compression set of cured rubber were measured in accordance with JIS K 6301. A gear oven was used as the apparatus for testing heat resistance. In the accompanying drawing, FIG. 1 is a diagrammatical illustration of the apparatus used for testing the deteriorated oil resistance of cured rubber.

In the FIGURE, reference numeral 1 indicates a compressor, numeral 2 indicates a filter, numeral 3 indicates a drier, numeral 4 indicates a flow meter, numeral 5 indicates an air supply tube, numeral 6 indicates a test piece, numeral 7 indicates a thermometer, numeral 8 indicates an engine oil, numeral 9 indicates a dipping tank, numeral 10 indicates a constant temperature tank, numeral 11 indicates a temperature detector, numeral 12 indicates a stirrer and numeral 13 indicates a heater.

The deteriorated oil resistance was measured by using the apparatus as illustrated in the FIGURE. Namely, JIS No. 3 dumbbell was dipped in test oil for a predetermined period of time, and the physical properties after dipping were measured in accordance with JIS K 6301.

The test conditions were as follows.

Mooney viscosity of raw rubber

The sample was preheated at a temperature of 100° C. for one minute, and the viscosity was measured four minutes later.

Heat resistance

The sample was exposed at 175° C. for 288 hours, whereupon the retention of elongation by tensile test $A_R(E_B)(\%)$ was obtained.

Oil resistance

The sample was dipped in JIS No. 3 oil at 150° C. for 70 hours, whereupon the volume change $V(\%)$ was measured.

Deteriorated oil resistance

Referring to the deteriorated oil resistance test apparatus of FIG. 1, the test piece 6 was dipped in the dipping tank 9 containing engine oil 8, and the temperature of the constant temperature tank 10 was adjusted so that the thermometer 7 showed a predetermined temperature. Air was introduced to the constant temperature tank 8 from the air supply tube 5 by the compressor 1. The test conditions were such that a test piece of JIS No. 3 dumbbell was dipped in automobile gasoline engine oil (SD 20W-40) at 150° C. for 288 hours, and during the dipping, air was supplied at a rate of 1 liter per minute to accelerate the deterioration of the engine oil. The test piece was subjected to tensile test after the dipping, and the retention of elongation $S_R(E_B)(\%)$ was obtained.

Permanent compression set

Compression set after 150° C. for 70 hours was measured in accordance with JIS K 6301.

EXAMPLES 1 to 4 and COMPARATIVE EXAMPLES 1 to 6

Into an autoclave having an internal capacity of 130 liters, 40 kg of a mixture of vinyl acetate and an acrylate, 43 kg of an aqueous solution containing 4% by weight of partially saponified polyvinyl alcohol, 60 g of sodium acetate and 600 g of glycidyl methacrylate were charged in such proportions that the composition of the copolymer would be as shown in Table 1 (the charged amounts are shown in brackets), and the mixture was thoroughly stirred by a stirrer to obtain a uniform suspension. Air at the upper portion in the autoclave was substituted by nitrogen, and then ethylene was injected to the upper portion of the autoclave, and the pressure was adjusted to a level of from 10 to 80 kg/cm². Stirring was continued, and the internal temperature was maintained at 45° C., and then an aqueous ammonium persulfate solution was injected from a separate inlet to initiate polymerization.

During the reaction, the internal temperature was maintained at 45° C., and the reaction was completed in 10 hours. An aqueous sodium borate solution was added to the formed polymer solution to solidify the polymer, which was then dehydrated and dried to obtain raw rubber.

The raw rubber was blended with other components as identified in the following Table by means of a 8 inch open roll and formed into a sheet having a thickness of 2.4 mm, which was then press-cured at 150° C. for 50 minutes by a press curing machine.

The cured product was further heat-treated at 160° C. for 16 hours in a gear oven, and then subjected to the physical property tests.

| Blend for kneading | |
|---|---|
| Raw rubber | 100 parts by weight |
| Stearic acid | 1 part by weight |
| Nowguard #445[(1)] | 1 part by weight |
| HAF carbon black | 50 parts by weight |
| 1-Cyanoethyl-2-methylimidazole | 0.35 part by weight |
| Ammonium benzoate | 0.30 part by weight |

Note:
[(1)]Deterioration preventive agent, manufactured by Uni Royal Co.

The compositions (% by weight) of copolymers and the measured values of their physical properties are shown in Table 1.

COMPARATIVE EXAMPLE 7

Raw rubber of a copolymer of Comparative Example 7 was prepared in the same manner as in Example 1 except that no ethylene was introduced, and 6 kg of vinyl acetate and as acrylates, 22 kg of n-butyl acrylate and 12 kg of ethyl acrylate were employed. This raw rubber was evaluated in the same manner as in Example 1.

The results are shown in Table 1.

COMPARATIVE EXAMPLE 8

Raw rubber of a copolymer of Comparative Example 8 was prepared in the same manner as in Example 1 except that 6 kg of vinyl acetate and as acrylates, 18 kg of n-butyl acrylate and 16 kg of methyl acrylate were employed. This raw rubber was evaluated in the same manner as in Example 1.

The results are shown in Table 1.

EXAMPLE 5

Into an autoclave having an internal capacity of 130 liters, a mixture comprising 5 kg of vinyl acetate, 12 kg of ethyl acrylate and 23 kg of n-butyl acrylate, 60 kg of an aqueous solution containing 4% by weight of partially saponified polyvinyl alcohol, 80 g of sodium acetate, 4000 g of monomethoxyethyl maleate, 130 g of sodium formaldehyde sulfoxylate, 13 g of tartaric acid and 8 g of ammonium ferrous sulfate were charged and thoroughly stirred by a stirrer to obtain a uniform suspension. Air at the upper portion in the autoclave was substituted by nitrogen, and ethylene was injected to the upper portion in the autoclave, and the pressure was adjusted to 45 kg/cm$^2$. Stirring was continued, and the internal temperature was maintained at 45° C. Then, an aqueous solution containing 0.5% of t-butyl hydroperoxide was introduced from a separate inlet, and 10 kg of ethyl acrylate and 20 kg of n-butyl acrylate were injected from another inlet, to let the polymerization proceed.

During the reaction, the internal temperature was maintained at 45° C. To the formed polymer solution, a 10% ammonium sulfate aqueous solution was added to solidify the polymer, which was then dehydrated, washed with water and dried to obtain raw rubber.

The raw rubber was kneaded with other components as identified in the following Table by means of a 8 inch open roll and formed into a sheet having a thickness of 2.4 mm, which was then press-cured at 150° C. for 50 minutes by a press curing machine.

This cured product was heat-treated in a gear oven at 160° C. for 16 hours, and then subjected to physical property tests.

| Blend for kneading | |
|---|---|
| Raw rubber | 100 parts by weight |
| Stearic acid | 1 part by weight |
| Nowguard #445 | 1 part by weight |
| HAF carbon black | 50 parts by weight |
| Methylenedianiline | 1.2 parts by weight |
| Diphenylguaniline | 4 parts by weight |

EXAMPLE 6

Into an autoclave having an internal capacity of 180 liters, a mixture comprising 6 kg of vinyl acetate, 16 kg of ethyl acrylate and 18 kg of n-butyl acrylate, 60 kg of an aqueous solution containing 4% by weight of partially saponified polyvinyl alcohol, 80 g of sodium acetate, 2000 g of methacrylic acid, 130 g of sodium formaldehyde sulfoxylate, 13 g of tartaric acid and 8 g of ammonium ferrous sulfate were charged and thoroughly stirred by a stirrer to obtain a uniform suspension. Air at the upper portion in the autoclave was substituted by nitrogen, and ethylene was injected to the upper portion of the autoclave, and the pressure was adjusted to 45 kg/cm$^2$. Stirring was continued, and the internal temperature was maintained at 45° C. Then, an aqueous solution containing 0.5% of t-butyl hydroperoxide was introduced in a separate inlet, and 10 kg of ethyl acrylate and 20 kg of n-butyl acrylate were injected from another inlet to let the polymerization proceed.

During the reaction, the internal temperature was maintained at 45° C. To the formed polymer solution, a 10% ammonium sulfate aqueous solution was added to solidify the polymer, which was dehydrated, washed with water and dried to obtain raw rubber.

The raw rubber was kneaded with other components as identified in the following Table by means of a 8 inch open roll and formed into a sheet having a thickness of 2.4 mm, which was press-cured at 150° C. for 50 minutes by a press curing machine.

The cured product was further heat-treated at 160° C. for 16 hours in a gear oven, and then subjected to physical property tests.

| Blend for kneading | |
|---|---|
| Raw rubber | 100 parts by weight |
| Stearic acid | 1 part by weight |
| Nowguard #445 | 1 part by weight |
| HAF carbon black | 50 parts by weight |
| Hexamethylenediamine carbamate | 0.62 part by weight |
| Di-o-tolylguanidine | 1 part by weight |

The results are shown in Table 1.

EXAMPLE 7

Into an autoclave having an internal capacity of 130 liters, a mixture comprising 6 kg, of vinyl acetate, 16 kg of ethyl acrylate and 18 kg of n-butyl acrylate, 60 kg of an aqueous solution containing 4% by weight of partially saponified polyvinyl alcohol, 80 g of sodium acetate, 1460 g of allylglycidyl ether, 130 g of sodium formaldehyde sulfoxylate, 13 g of tartaric acid and 8 g of ammonium ferrous sulfate were introduced and thoroughly stirred by a stirrer to obtain a uniform suspension. Air at the upper portion in the autoclave was substituted by nitrogen. Then, ethylene was injected to the upper portion in the autoclave, and the pressure was adjusted to 45 kg/cm². Stirring was continued, and the internal temperature was maintained at 45° C. Then, an aqueous solution containing 0.5% of t-butyl hydroperoxide was introduced in a separate inlet, and 10 kg of ethyl acrylate and 20 kg of n-butyl acrylate were introduced from another inlet to let the polymerization proceed.

During the reaction, the internal temperature was maintained at 45° C. To the formed polymer solution, a 10% ammonium sulfate aqueous solution was added to solidify the polymer, which was dehydrated, washed with water and dried to obtain raw rubber.

The raw rubber was evaluated in the same manner as in Examples 1 to 4.

The results are shown in Table 1.

entire copolymer components except for ethylene and crosslinkable monomers, being 100% by weight.

From comparison between Examples 1 to 7 and Comparative Examples 1 to 8, it is apparent that when ethylene is less than 3% by weight in the copolymer, the cold resistance is poor, and when it exceeds 10% by weight, the oil resistance tends to deteriorate. When vinyl acetate exceeds 10% by weight in the component (c), the cold resistance of the copolymer tends to be low. When n-butyl acrylate exceeds 70% by weight in the component (c), the oil resistance tends to be poor, and when ethyl acrylate exceeds 45% by weight in the component (c), the deteriorated oil resistance tends to be low.

Further, when ethyl acrylate is substituted by methyl acrylate, the balance of the cold resistance and the deteriorated oil resistance tends to be poor.

Thus, it is evident that only when the polymer composition is strictly controlled as in the present invention,

TABLE 1

| Copolymer composition | Examples | | | | | | | Comparative Examples | | | | | | | |
|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 |
| Ethylene (%) | 6 (45) | 7 (45) | 5 (45) | 7 (45) | 5 (45) | 6 (45) | 6 (45) | 6 (45) | 6 (45) | 6 (45) | 7 (45) | 6 (45) | 13 (80) | 0 (0) | 7 (45) |
| Crosslinkable monomers: | | | | | | | | | | | | | | | |
| Glycidyl methacrylate (%) (kg) | 1.8 (0.6) | 1.7 (0.6) | 1.7 (0.6) | 1.7 (0.6) | — | — | — | 1.7 (0.6) | 1.7 (0.6) | 1.7 (0.6) | 1.7 (0.6) | 1.6 (0.6) | 1.7 (0.6) | 1.5 (0.6) | 1.5 (0.6) |
| Monomethoxy-ethyl maleate (%) (kg) | — | — | — | — | 4 (4) | — | — | — | — | — | — | — | — | — | — |
| Methacrylic acid (%) (kg) | — | — | — | — | — | 5 (2) | — | — | — | — | — | — | — | — | — |
| Allylglycidyl ether (%) (kg) | — | — | — | — | — | — | 1 (1.46) | — | — | — | — | — | — | — | — |
| Other monomers: | | | | | | | | | | | | | | | |
| (%) | 92.2 | 91.3 | 93.3 | 91.3 | 91 | 89 | 93 | 92.3 | 92.3 | 92.3 | 91.3 | 92.4 | 85.3 | 98.5 | 91.5 |
| Vinyl acetate (%) (kg) | 5 (3.2) | 9 (6) | — | 9 (6) | 7 (5) | 10 (6) | 9 (6) | — | 10 (7) | 14 (11) | — | 8 (4) | 9 (6) | 10 (6) | 10 (6) |
| n-Butyl acrylate (%) (kg) | 60 (24.8) | 56 (22) | 61 (26.0) | 48 (18) | 59 (43) | 48 (38) | 47 (38) | 51 (21) | 41 (17) | 50 (18) | 71 (29) | 72 (28) | 57 (22) | 54 (22) | 46 (18) |
| Ethyl acrylate (%) (kg) | 35 (12.0) | 35 (12) | 39 (14.0) | 43 (16) | 34 (22) | 42 (26) | 44 (26) | 49 (19) | 49 (16) | 36 (11) | 29 (11) | 20 (8) | 34 (12) | 36 (12) | — |
| Methylacrylate (%) (kg) | — | — | — | — | — | — | — | — | — | — | — | — | — | — | 44 (16) |
| Mooney viscosity of raw rubber | 34 | 38 | 41 | 36 | 45 | 40 | 30 | 34 | 34 | 35 | 29 | 38 | 38 | 40 | 45 |
| Physical properties of cured products | | | | | | | | | | | | | | | |
| Tensile strength (kg/cm²) | 128 | 142 | 142 | 143 | 103 | 111 | 128 | 149 | 148 | 131 | 124 | 125 | 142 | 125 | 184 |
| Elongation (%) | 220 | 240 | 260 | 240 | 180 | 370 | 300 | 240 | 240 | 220 | 260 | 200 | 240 | 190 | 280 |
| Hardness | 64 | 66 | 63 | 69 | 65 | 64 | 67 | 66 | 70 | 68 | 64 | 66 | 66 | 67 | 72 |
| Permanent compression set (%) | 35 | 32 | 35 | 34 | 21 | 24 | 30 | 36 | 35 | 38 | 39 | 40 | 32 | 38 | 35 |
| Cold resistance (°C.) | −42 | −35 | −41 | −35 | −43 | −44 | −38 | −39 | −29 | −29 | −39 | −41 | −40 | −28 | −16 |
| Oil resistance ΔV (%) | 54 | 51 | 56 | 44 | 51 | 48 | 46 | 50 | 38 | 44 | 70 | 66 | 72 | 43 | 23 |
| Heat resistance $A_R(E_B)$ (%) | 54 | 54 | 60 | 50 | 67 | 65 | 63 | 60 | 48 | 49 | 58 | 55 | 54 | 50 | 46 |
| Deteriorated oil resistance SR(EB) (%) | 30 | 58 | 55 | 55 | 56 | 62 | 60 | 48 | 47 | 52 | 57 | 55 | 56 | 58 | 43 |
| Crack when stretched | No | No | No | No | No | No | No | Yes | Yes | No | No | No | No | No | Yes |

Note: Numerical values in brackets in the copolymer composition indicate charged amounts (kg), provided that in the case of ethylene, they indicate charging pressures (kg/cm²).

The proportions of ethylene and crosslinkable monomers in Table 1 represent % by weight in the respective copolymers. The proportions of vinyl acetate, n-butyl acrylate, ethyl acrylate and methyl acrylate represent % by weight of the respective constituents based on the total amount of other monomer component (c), i.e. the it is possible to obtain a copolymer composition having excellent cold resistance, oil resistance, heat resistance and deteriorated oil resistance.

EXAMPLES 8 to 11 and COMPARATIVE EXAMPLES 9 to 14

Into an autoclave having an internal capacity of 130 liters, 40 kg of a mixture comprising vinyl acetate and acrylates, 43 kg of an aqueous solution containing 4% by weight of partially saponified polyvinyl alcohol and 60 g of sodium acetate were charged by changing such amounts of vinyl acetate and n-butyl acrylate and ethyl acrylate that the copolymer rubber composition would be as shown in Table 2 (charged amounts are shown in brackets in Table 2) and thoroughly stirred by a stirrer to obtain a uniform suspension. Air at the upper portion in the autoclave was substituted by nitrogen. Then, ethylene was injected to the upper portion in the autoclave, and the pressure was adjusted to a level of from 10 to 80 kg/cm². Stirring was continued, and the internal temperature was maintained at 45° C. Then, an aqueous ammonium persulfate solution was injected from a separate inlet to initiate polymerization.

During the reaction, the internal temperature was maintained at 45° C., and the reaction was completed in 10 hours. To the formed polymer solution, an aqueous sodium borate solution was added to solidify the polymer, which was dehydrated and dried to obtain raw rubber.

The raw rubber was kneaded with other components as identified in the following Table by means of a 8 inch open roll and formed into a sheet having a thickness of 2.4 mm, which was press-cured at 150° C. for 50 minutes by a press curing machine.

This cured product was further heat-treated at 160° C. for 16 hours in a gear oven and then subjected to physical property tests.

| Blend for kneading | |
|---|---|
| Raw rubber | 100 parts by weight |
| Stearic acid | 1 part by weight |
| Nowguard #445 | 1 part by weight |
| MAF carbon black | 50 parts by weight |
| Liquid paraffin | 2 parts by weight |
| Trimethylthio urea | 0.2 part by weight |
| Trimethylolpropane trimethacrylate | 1 part by weight |
| Perhexa V—40[(2)] | 8 parts by weight |

Note:
[(2)] 40% n-butyl-4,4-bis(t-butylperoxy)-valerate as organic peroxide, manufactured by Nippon Oil & Fats Co., Ltd.

The compositions (% by weight) of the copolymer rubbers and the measured values of their physical properties are shown in Table 2.

COMPARATIVE EXAMPLE 15

Raw rubber of a copolymer of Comparative Example 15 was prepared in the same manner as in Comparative Examples 9 to 14 except that no ethylene was introduced, and 6 kg of vinyl acetate and as acrylates, 22 kg of n-butyl acrylate and 12 kg of ethyl acrylate were employed. This raw rubber was evaluated in the same manner as in Comparative Examples 8 to 14.

The results are shown in Table 2.

COMPARATIVE EXAMPLE 16

Raw rubber of a copolymer of Comparative Example 16 was prepared in the same manner as in Comparative Examples 9 to 14 except that 6 kg of vinyl acetate and as acrylates, 18 kg of n-butyl acrylate and 16 kg of methyl acrylate were employed. This raw rubber was evaluated in the same manner as in Comparative Examples 9 to 14.

The results are shown in Table 2.

TABLE 2

| Copolymer composition | Examples | | | | Comparative Examples | | | | | | | |
|---|---|---|---|---|---|---|---|---|---|---|---|---|
| | 8 | 9 | 10 | 11 | 9 | 10 | 11 | 12 | 13 | 14 | 15 | 16 |
| Ethylene (%) | 6 | 7 | 5 | 7 | 6 | 5 | 6 | 8 | 6 | 12 | 0 | 7 |
| | (45) | (45) | (45) | (45) | (45) | (45) | (45) | (45) | (45) | (80) | (0) | (45) |
| Other monomers: | | | | | | | | | | | | |
| (%) | 94 | 93 | 95 | 93 | 94 | 95 | 94 | 92 | 94 | 88 | 100 | 93 |
| Vinyl acetate (%) | 6 | 9 | — | 10 | — | 9 | 16 | — | 8 | 8 | 11 | 11 |
| (kg) | (3.2) | (6) | | (6) | | (7) | (12) | | (4) | (6) | (6) | (6) |
| n-Butyl acrylate (%) | 59 | 57 | 60 | 47 | 50 | 43 | 51 | 72 | 70 | 55 | 53 | 44 |
| (kg) | (24.8) | (22) | (26) | (18) | (21) | (17) | (18) | (29) | (28) | (22) | (22) | (18) |
| Ethyl acrylate | | | | | | | | | | | | |
| (%) | 35 | 36 | 40 | 43 | 50 | 48 | 33 | 28 | 22 | 37 | 36 | — |
| (kg) | (12.0) | (12) | (14) | (16) | (49) | (16) | (10) | (11) | (8) | (12) | (12) | |
| Methyl acrylate (%) | — | — | — | — | — | — | — | — | — | — | — | 45 |
| (kg) | | | | | | | | | | | | (16) |
| Mooney viscosity of raw rubber | 30 | 32 | 30 | 33 | 30 | 31 | 32 | 23 | 33 | 35 | 35 | 40 |
| Physical properties of cured products | | | | | | | | | | | | |
| Tensile strength (kg/cm²) | 108 | 121 | 124 | 120 | 127 | 128 | 118 | 104 | 107 | 119 | 106 | 160 |
| Elongation (%) | 280 | 310 | 310 | 300 | 280 | 310 | 290 | 340 | 260 | 270 | 230 | 340 |
| Hardness | 65 | 65 | 65 | 70 | 64 | 70 | 67 | 61 | 65 | 66 | 67 | 71 |
| Permanent compression set (%) | 16 | 17 | 15 | 17 | 17 | 17 | 16 | 20 | 18 | 15 | 19 | 21 |
| Cold resistance (°C.) | −41 | −33 | −40 | −33 | −38 | −27 | −28 | −37 | −40 | −37 | −25 | −14 |
| Oil resistance ΔV (%) | 52 | 49 | 53 | 40 | 47 | 37 | 41 | 70 | 63 | 71 | 40 | 20 |
| Heat resistance $A_R(E_B)$ (%) | 75 | 71 | 77 | 70 | 79 | 68 | 72 | 76 | 77 | 74 | 74 | 65 |
| Deteriorated oil resistance SR(EB) (%) | 57 | 61 | 61 | 57 | 50 | 52 | 55 | 62 | 62 | 63 | 57 | 50 |
| Crack when stretched | No | No | No | No | Yes | Yes | No | No | No | No | No | Yes |

Note: Numerical values in brackets in the copolymer composition indicate charged amounts (kg), provided that in the case of ethylene, they indicate charging pressures (kg/cm²).

The proportions of ethylene and crosslinkable monomers in Table 2 represent % by weight in the respective copolymers. The proportions of vinyl acetate, n-butyl acrylate, ethyl acrylate and methyl acrylate represent % by weight of the respective constituents based on the total amount of other monomer component (c), i.e. the entire copolymer components except for ethylene and crosslinkable monomers, being 100% by weight.

From comparison between Example 8 and Comparative Examples 9 to 16, it is apparent that when ethylene is less than 3% by weight in the copolymer, the cold resistance is poor, and when it exceeds 10% by weight, the oil resistance tends to deteriorate. When vinyl acetate exceeds 10% by weight in the component (c), the cold resistance of the copolymer tends to be low. When n-butyl acrylate exceeds 70% by weight in the component (c), the oil resistance tends to be poor, and when ethyl acrylate exceeds 45% by weight in the component (c), the deteriorated oil resistance tends to be low.

Further, when ethyl acrylate is substituted by methyl acrylate, the balance of the cold resistance and the deteriorated oil resistance tends to be poor.

Thus, it is evident that only when the polymer composition is strictly controlled as in the present invention, it is possible to obtain a copolymer composition having excellent cold resistance, oil resistance, heat resistance and deteriorated oil resistance.

What is claimed is:

1. An acrylic rubber composition comprising (A) a copolymer and (B) a crosslinking agent, said copolymer (A) consisting essentially of (a) from 3 to 10% by weight of ethylene, (b) from 0 to 10% by weight of at least one crosslinkable monomer selected from the group consisting of monomers of the formulas (1), (2), (3) and (4):

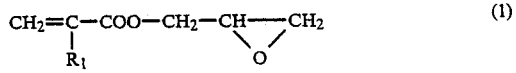

wherein $R_1$ is hydrogen or methyl,

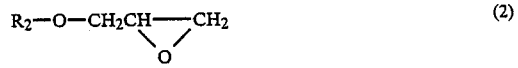

wherein $R_2$ is vinyl, allyl or methallyl,

wherein $R_3$ is hydrogen or methyl, $R_4OOC-CH=CH-COOH$ (4) wherein $R_4$ is methyl, ethyl, propyl, butyl, methoxymethyl methoxyethyl, methoxypropyl, methoxybutyl, ethoxybutyl, ethoxyethyl, ethoxypropyl or ethoxybutyl, and (c) from 80 to 97% by weight of other copolymer component, said other copolymer component (c) consisting essentially of (i) from to 10% by weight of vinyl acetate, (ii) from 20 to 45% by weight of ethyl acrylate and (iii) from 45 to 70% by weight of n-butyl acrylate, the total amount of constituents (i), (ii) and (iii) being 100% by weight.

2. The acrylic rubber composition according to claim 1, wherein the crosslinking agent (B) is an organic peroxide, and the crosslinkable monomer (b) is 0% by weight.

3. The acrylic rubber composition according to claim 1, wherein the crosslinkable monomer (b) is from 0.1 to 10% by weight, and the crosslinking agent (B) is an amine type crosslinking agent.

4. The acrylic rubber composition according to claim 1, wherein the crosslinkable monomer (b) is selected from the group consisting of monomers of the formulas (1) and (2), and the crosslinking agent (B) is a compound having an ability to open an epoxy group.

5. The acrylic rubber composition according to claim 1, wherein the crosslinkable monomer (b) is selected from the group consisting of monomers of the formula (3) and (4), and the crosslinking agent (B) is a combination of methylenedianiline or hexamethylenediamine carbamate and diphenylguanidine or di-o-tolylguanidine.

6. The acrylic rubber composition according to claim 1, wherein the crosslinkable monomer (b) is a combination of at least one member selected from the group consisting of monomers of the formulas (1) and (2) and at least one member selected from the group consisting of monomers of the formulas (3) and (4), and the crosslinking agent (B) is a quaternary ammonium salt and/or a dibasic acid.

7. The acrylic rubber composition according to claim 1, wherein the crosslinkable monomer (b) is glycidyl methacrylate.

8. The acrylic rubber composition according to claim 1, wherein the crosslinkable monomer (b) is glycidyl acrylate.

9. The acrylic rubber composition according to claim 1, wherein the crosslinkable monomer (b) is allylglycidyl ether.

10. The acrylic rubber composition according to claim 1, wherein the crosslinkable monomer (b) is a combination of glycidyl methacrylate and/or glycidyl acrylate and allylglycidyl ether.

11. The acrylic rubber composition according to claim 1, wherein the crosslinkable monomer (b) is monomethoxyethyl maleate.

12. The acrylic rubber composition according to claim 1, wherein the crosslinkable monomer (b) constitutes from 0.1 to 10% by weight in the copolymer.

13. The acrylic rubber composition according to claim 1, wherein the crosslinkable monomer (b) constitutes from 1 to 7% by weight in the copolymer.

14. The acrylic rubber composition according to claim 3, wherein the crosslinking agent (b) is guanidine.

15. The acrylic rubber composition according to claim 4, wherein the crosslinking agent (B) is an imidazole type compound.

16. The acrylic rubber composition according to claim 4, wherein the crosslinking agent is a combination of an imidazole type compound and at least one member selected from the group consisting of ammonium benzoate, guanidines, dibasic acids, dibasic acid anhydrides and alkyl sulfates.

17. The acrylic rubber composition according to claim 4, wherein the crosslinking agent (B) is from 0.1 to 5 parts by weight relative to 100 parts by weight of the copolymer.

18. The acrylic rubber composition according to claim 5, wherein the crosslinking agent (B) is from 0.1 to 10 parts by weight relative to 100 parts by weight of the copolymer.

19. The acrylic rubber composition according to claim 6, wherein the crosslinking agent is from 0.1 to 10 parts by weight relative to 100 parts by weight of the copolymer.

20. The acrylic rubber composition according to claim 2, wherein the peroxide is selected from the group consisting of benzoyl peroxide, 2,4-dichlorobenzoyl peroxide, 1,1-di(t-butylperoxy)-3,3,5-trimethylcyclohexane, n-butyl-4,4-bis(t-butylperoxy)valerate, dicumyl peroxide, di-t-butylperoxy-diisopropylbenzene, 2,5-dimethyl-2,5-di(t-butylperoxy)hexane and 2,5-dimethyl-2,5-di(t-butylperoxy)hexyne-3, and its content is from 1 to 10 parts by weight relative to 100 parts by weight of the copolymer.

21. The acrylic rubber composition according to claim 1, wherein the crosslinkable monomer (b) is 0% by weight, the crosslinking gent is a peroxide, and the rubber composition further contains a curing coagent 22. The acrylic rubber composition according to claim 1, wherein the crosslinkable monomer (b) is 0% by weight, the crosslinking agent is a peroxide, and the rubber composition further contains a cure controlling agent.

23. The acrylic rubber composition according to claim 1, wherein the crosslinkable monomer (b) is 0% by weight, and the crosslinking agent is a peroxide, and the rubber composition further contains a curing coagent and a cure controlling agent.

24. The acrylic rubber composition according to claim 23, wherein the curing coagent is trimethylolpropane trimethacrylate, triallyl cyanurate, triallyl isocyanurate, triallyl trimellitate, ethylene glycol dimethacrylate, polyethylene glycol dimethacrylate, trimethylolpropane triacrylate, ethylene glycol diacrylate and/or triethylene glycol diacrylate, and it is contained in an amount of from 0.2 to 20 parts by weight relative to 100 parts by weight of the copolymer.

25. The acrylic rubber composition according to claim 23, wherein the cure controlling agent is trimethylthiourea and/or phenothiazine, and it is contained in an amount of from 0.1 to 5 parts by weight relative to 100 parts by weight of the copolymer.

* * * * *